(12) United States Patent
Hauptvogel et al.

(10) Patent No.: US 11,181,049 B2
(45) Date of Patent: Nov. 23, 2021

(54) METHOD FOR OPERATING AN INTERNAL COMBUSTION ENGINE OF A MOTOR VEHICLE, IN PARTICULAR OF A MOTOR CAR

(71) Applicant: Daimler AG, Stuttgart (DE)

(72) Inventors: Mathias Hauptvogel, Wiepersdorf (DE); Markus Schilling, Stuttgart (DE); Peter Hohner, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/770,147

(22) PCT Filed: Nov. 27, 2018

(86) PCT No.: PCT/EP2018/082665
§ 371 (c)(1),
(2) Date: Jun. 5, 2020

(87) PCT Pub. No.: WO2019/110372
PCT Pub. Date: Jun. 13, 2019

(65) Prior Publication Data
US 2021/0172388 A1 Jun. 10, 2021

(30) Foreign Application Priority Data
Dec. 7, 2017 (DE) ...................... 10 2017 011 301.7

(51) Int. Cl.
*B60T 7/12* (2006.01)
*F02D 13/02* (2006.01)
(Continued)

(52) U.S. Cl.
CPC ...... *F02D 13/0215* (2013.01); *F01L 13/0036* (2013.01); *F01L 13/08* (2013.01);
(Continued)

(58) Field of Classification Search
CPC .... F02D 41/042; F02D 41/02; F02D 13/0203; F02D 13/0276; F02D 41/0005; F02D 2041/002; F02D 2250/41; F01L 13/0036
See application file for complete search history.

(56) References Cited

U.S. PATENT DOCUMENTS

| | | | | |
|---|---|---|---|---|
| 3,747,574 A | * | 7/1973 | Bland | F02B 75/265 123/21 |
| 4,736,715 A | * | 4/1988 | Larsen | F02F 7/0087 123/64 |

(Continued)

FOREIGN PATENT DOCUMENTS

| | | |
|---|---|---|
| DE | 10 2008 008 117 A1 | 8/2009 |
| DE | 10 2008 036 635 A1 | 3/2010 |

OTHER PUBLICATIONS

PCT/EP2018/082665, International Search Report dated Mar. 6, 2019 (Two (2) pages).

*Primary Examiner* — John Kwon
(74) *Attorney, Agent, or Firm* — Crowell & Moring LLP

(57) ABSTRACT

A method for operating an internal combustion engine having a cylinder, an intake valve, an air pipe, and a valve element disposed in the air pipe, includes detecting a signal for causing a fuel supply of the cylinder to switch off. The valve element is moved out of a first position into a second position triggering a lower flow cross-section while the fuel supply is still activated, where a first cam for actuating the intake valve is allocated to the intake valve. While the fuel supply is still activated, switching from the first cam to a second cam and via the second cam the intake valve is actuated such that the intake valve causes a reduced air intake. An exhaust cam shaft for actuating an exhaust valve is set in an advance direction such that a valve intersection of the intake valve and of the exhaust valve ceases.

7 Claims, 5 Drawing Sheets

(51) Int. Cl.
  *F01L 13/00* (2006.01)
  *F01L 13/08* (2006.01)
  *F02D 41/00* (2006.01)
  *F02D 41/38* (2006.01)
  *F02P 5/15* (2006.01)

(52) U.S. Cl.
  CPC ..... *F02D 13/0234* (2013.01); *F02D 41/0002* (2013.01); *F02D 41/38* (2013.01); *F02P 5/1502* (2013.01); *F02D 2041/002* (2013.01); *F02D 2041/389* (2013.01)

(56) References Cited

U.S. PATENT DOCUMENTS

| | | |
|---|---|---|
| 6,257,194 B1 | 7/2001 | Kerns et al. |
| 2906/0075990 | 4/2006 | Muto et al. |
| 2909/0995244 | 4/2009 | Leone et al. |
| 2910/0139618 | 6/2010 | Yoon et al. |
| 2020/0102898 A1* | 4/2020 | Masukake ............ F02D 41/005 |

\* cited by examiner

METHOD FOR OPERATING AN INTERNAL COMBUSTION ENGINE OF A MOTOR VEHICLE, IN PARTICULAR OF A MOTOR CAR

BACKGROUND AND SUMMARY OF THE INVENTION

The invention relates to a method for operating an internal combustion engine of a motor vehicle, in particular of a motor car.

An internal combustion engine having several cylinders is already known from DE 10 2008 008 117 A1, the cylinders each having at least one valve. Furthermore, at least one valve drive device is provided which is formed to actuate the valves of at least one of the cylinders in a first position with a normal valve stroke and, in a second position, at least with a second valve stroke formed as a decompression stroke.

Moreover, internal combustion engines are already adequately known from the general prior art and, in particular, from serial vehicle production. Here, the respective internal combustion engine has at least one combustion chamber formed as a cylinder and at least one exhaust gas tract, which exhaust gas from the combustion chamber can flow through. Usually, at least one exhaust gas after-treatment element is arranged in the exhaust gas tract, the element being formed, for example, as a catalytic converter, in particular as a three-way catalytic converter, or comprising at least one such catalytic converter, in particular three-way catalytic converter. In a fired operation of the internal combustion engine, the exhaust gas emerges in the cylinder, which can flow out of the cylinder and into the exhaust gas tract and flow through the exhaust gas tract. Thus, the exhaust gas flows through the exhaust gas after-treatment element during the fired operation.

The object of the present invention is to create a method by means of which a particularly low-emission operation of an internal combustion engine of a motor vehicle can be achieved.

In the method according to the invention for operating at least one internal combustion engine of a motor vehicle, in particular a motor car, the internal combustion engine having at least one combustion chamber formed as a cylinder, the internal combustion engine has the combustion chamber formed as a cylinder and at least one piston, which is moveably, in particular translationally moveably, received in the cylinder. The internal combustion engine further has an intake valve allocated to the cylinder and at least one air pipe that air can flow through, which is also referred to as a suction pipe, intake pipe, air channel or air line. The air flowing through the air pipe can be supplied to the cylinder via the air pipe. In other words, with an operation of the internal combustion engine, the air flowing through the air pipe is supplied to the cylinder by means of the air pipe, i.e., guided into the cylinder. Here, the air flows through the air pipe and flows via the intake valve, in particular when this is open, into the cylinder. Here, at least the air flowing through the air pipe can be supplied to the cylinder by means of the air pipe.

The internal combustion engine furthermore has at least one valve element arranged in the air pipe, by means of which a flow cross-section, in particular of the air pipe, that air can flow through can be set. In other words, the flow cross-section can be varied by means of the valve element and thus set to values different from one another, whereby a pressure prevailing in the air pipe, for example, can be set, i.e., can be varied. Usually, the valve element is formed as a throttle flap or is referred to as a throttle flap, which can be moved, in particular pivoted, between several positions differing from one another, in particular in relation to the air pipe, to set or vary the flow cross-section and thus to set or vary the pressure prevailing in the air pipe.

In order to here be able to obtain a particularly low-emission operation of the internal combustion engine in a particularly simple manner, the method according to the invention comprises a first step, in which at least one, in particular electrical or electronic, signal for causing a fuel supply of the cylinder to switch off is detected in particular by means of an electronic calculating device of the internal combustion engine. The electronic calculating device is also referred to as a control device or engine control device, for example. The internal combustion engine is, for example, initially operated in an operating state in which the fuel supply of the cylinder is activated. Because the fuel supply is activated, the cylinder is supplied with fuel during the operating state and thus during a period of time in which the operating mode is set, for operating the internal combustion engine, in particular in its fired operation. The fuel is, for example, a liquid fuel or a gaseous fuel, wherein the fuel can, for example, be petrol or a gasoline or a gaseous fuel, such as LPG (liquefied petroleum gas) or CNG (compressed natural gas). In particular, it is provided that the internal combustion engine is at least substantially stoichiometric in the operating state or during the operating state and thus during the fired operation, i.e., is operated with a stoichiometric mixture in the cylinder, wherein the mixture comprises at least the air, which is supplied to the cylinder, and the fuel, which is supplied to the cylinder A stoichiometric mixture or a stoichiometric operation is here to be understood to mean that the combustion air ratio, which is also referred to with $\lambda$ or as lambda, is at least substantially 1. The fuel supply, mentioned above is to be understood to mean that when the fuel supply is activated, the fuel is introduced, in particular injected, into the cylinder, wherein it can be provided, in particular, that the fuel is injected directly into the cylinder. By supplying the cylinder with fuel and air, the mixture mentioned above emerges, which is also called the fuel-air mixture.

Preferably, the internal combustion engine is a spark-ignited internal combustion engine, in which, in particular during the fired operation or in the operating state, ignites the mixture in the cylinder by means of spark ignition, i.e., by means of a spark ignition device such as a spark plug, for example, and is consequently combusted. To do so, the ignition device provides at least one ignition spark, in particular in the cylinder, such that the mixture is ignited in the cylinder by means of the ignition spark and is consequently combusted. By igniting and combusting the mixture, exhaust gas emerges in the cylinder, in particular during the fired operation or during the operating state. The exhaust gas can, for example, flow out of the cylinder and, in particular, flow into an exhaust gas tract of the internal combustion engine and flow through the exhaust gas tract, whereby the exhaust gas is conducted away from the cylinder. In particular, the exhaust gas is forced out of the cylinder by means of the piston, for example, in particular by the piston moving out of its lower dead center (UT) into its upper dead center (OT). The air is supplied to the cylinder, for example, by, on its way, the piston sucking the air out of its upper dead center into its lower dead center and thus sucking into the cylinder.

The signal constitutes, for example, a request, in particular a propulsion request, by means of which, for example, the control device or a program carried out by means of the control device, in particular a software program, requests the switching off, i.e., the deactivation, of the fuel supply. Switching off the fuel supply of the cylinder is thus to be understood, in particular, to mean that the supply of the cylinder with the fuel is ended. In doing so, the initially activated or carried out fired operation, for example, of the internal combustion engine is deactivated or switched off, such that then the internal combustion engine, for example, is then completely switched off or deactivated or stopped, or such that a propulsion operation of the internal combustion engine is activated. As part of or for achieving the propulsion operation, a so-called propulsion switch-off is carried out, as part of which the fuel supply of the cylinder is switched off, wherein, during the propulsion operation, the internal combustion engine or its piston is driven by the moving motor vehicle, in particular by means of at least one wheel of the moving vehicle and thus by means of kinetic energy, wherein combustion processes in the cylinder cease during the propulsion operation.

The deactivation, mentioned above, of the internal combustion engine is also referred to overall as parking of the internal combustion engine. As a result of parking the internal combustion engine, both combustions processes in the cylinder or in the internal combustion engine overall cease, as well as movements of the piston in the cylinder. As will be explained in more detail below, the method according to the invention is particularly suitable for the propulsion operation, the parking and a restart following the parking of the internal combustion engine in order to here be able to achieve a particularly low-emission operation of the internal combustion engine and thus the motor vehicle overall. Here, the method is particularly suitable when the motor vehicle is formed as a hybrid vehicle or as a vehicle with a start-stop function of the internal combustion engine, since it results in a very high number of alternatingly successive deactivations and restarts of the internal combustion engine during an operation of the motor vehicle. It has been found that, with conventional internal combustion engines, in particular during the propulsion operation, and with a restart following a parking of the internal combustion engine, it can lead to unfavorable emissions, which, however, can now be reduced by means of the method according to the invention.

The method according to the invention comprises a second step, which is also called step b). In the second step, as a result of detecting the signal, the valve element is moved out of a first position into a second position different from the first position. This means that the valve element is initially in the first position and, as a result of detecting the signal, i.e., for example as a result of the request described above, is moved out of the first position into the second position. In the first position, the valve element triggers a first value of the flow cross-section. This means that a first value of the flow cross-section is set by the first position of the valve element and thus by the valve element in the first position. The second position of the valve element or the valve element in the second position triggers a second value of the flow cross-section, or a second value, different from the first value, of the flow cross-section is set by the valve element in the second position, wherein the second value is smaller than the first value. Preferably, the first value and the second value are greater than zero, such that, for example both in the first position and in the second position, air can flow through the air pipe, yet the valve element in the second position, for example, in comparison to the first position represents a greater flow resistance for the air, such that the air pipe, for example, or the air flowing through the air pipe is restricted more greatly in the second position by means of the valve element in comparison to the first position. Moving the valve element from the first position into the second position is carried out while the fuel supply of the cylinder is still activated, and a first cam is allocated to the intake valve for actuating the intake valve, or the intake valve is actuated by means of a first cam. In other words, the first step is performed while the fuel supply of the cylinder is still activated, and the intake valve is actuated by means of the first cam. This means that the first step or its implementation is indeed carried out from receiving the signal to causing the fuel supply of the cylinder to switch off, yet the fuel supply is still activated during the first step and is thus still not switched off, for example.

Moreover, the method according to the invention comprises a third step, which is also called step c). The third step is also carried out as a result of detecting the signal, wherein the third step preferably follows on from the second step, i.e., the third step is preferably carried out temporally after the second step and thus following on from the second step. Here, the third step is carried out while the fuel supply of the cylinder is still activated. In other words, the fuel supply of the cylinder is still activated during the third step and is thus not yet switched off, for example. In general, it is recognizable that the second step and the third step are indeed carried out as a result of detecting the signal to effectuate the switching off of the fuel supply, yet the fuel supply is still activated during the second step and is still activated during the third step and not yet switched off; for example.

In the third step, while the fuel supply of the cylinder is still activated, it is switched from the first cam onto a second cam different from the first cam, by means of which second cam the intake valve is actuated as a result of the switching in such a way that the intake valve causes a reduced air intake in comparison to the actuation of the intake valve caused before by means of the first cam. In comparison to the first cam, for example, the second cam is thus a so-called cam that reduces air intake, by means of which, as a result of the switching from the first cam to the second cam, the intake valve is actuated in such a way, that the intake valve causes a reduced air intake into the cylinder in comparison to the actuation of the intake valve caused by means of the first cam before the switching, in particular under the same conditions. This means that, under the same conditions, i.e., in particular with the same pressure prevailing in the air pipe, at the same temperature of the air and for the same period of time, the second cam, in comparison to the first cam, or an actuation of the intake valve caused by means of the second cam, in comparison to an actuation of the intake valve caused by means of the first cam, lets in a smaller amount of the air into the cylinder. Again in other words, an air intake reduction into the cylinder is caused as a result of switching from the first cam to the second cam, in particular under the same conditions.

In particular, it is preferably provided that, during the second step, the first cam also called the standard cam or formed as a standard cam is retained. In other words, it is preferably provided that an actuation of the intake valve is still carried out by means of the first cam in the second step or during the second step.

As a result of the method according to the invention, washing the exhaust gas tract of the internal combustion engine mentioned above with oxygen or with an excessive amount of oxygen is avoided, such that unwanted hyper-stoichiometric or poor conditions with $\lambda>1$ can be avoided in the exhaust gas tract. Here, the invention is based on the following understanding: in the exhaust gas tract, at least one exhaust gas post-treatment element is arranged, for example, which, for example, comprises at least one catalytic converter, in particular at least one three-way catalytic converter, or is formed as a catalytic converter, in particular as a three-way catalytic converter. With internal combustion engines, during the respective propulsion operation and, for example, with a restart after switching off the respective internal combustion engine, it regularly results in a cleaning of the exhaust gas tract of the respective internal combustion engine with fresh air and thus with oxygen, such that hyperstoichiometric conditions can emerge in the exhaust gas tract and, in particular, in the catalytic converter, in other words, with internal combustion engines, it then results in a cleaning of the catalytic converter with oxygen. This means that an amount of air and thus oxygen flows through the catalytic converter, such that it can result in hyperstoichiometric conditions in the catalytic converter, i.e., in such conditions which emerge or which would emerge with hyperstoichiometric operation of the internal combustion engine operating actually or principally stoichiometrically. As a result of such hyperstoichiometric conditions in the exhaust gas after-treatment element, its unwanted ability or function to after-treat the exhaust gas can at least be extensively impaired, such that, for example during the propulsion operation and/or with a restart after switching off the internal combustion engine, it can lead to unwanted high emissions. However, this can now be avoided by the method according to the invention, since, as a result of the method according to the invention, a cleaning of the exhaust gas tract and thus the exhaust gas after-treatment element with air and thus with oxygen can be avoided or considerably reduced.

Moreover, the invention is based on the following understanding: the real operation of an internal combustion engine, also called a combustion motor, is characterised by constantly alternating loads. This means that the internal combustion engine is usually, operated transiently or has a transient operation, such that a load to be released by the internal combustion engine or a torsional moment to be provided by the internal combustion engine during the operation of the internal combustion engine varies. If the internal combustion is not to release any power or any load or any torsional moment, such as is the case, for example, during the propulsion operation and after switching off the internal combustion engine, the fuel supply, also called the fuel feed of the cylinder, is at least temporally interrupted, i.e., for example during the propulsion operation. During the propulsion operation, the internal combustion engine, also simply called the motor, is then towed by the moving motor vehicle and thus by its mass with momentum.

This is to be understood, in particular, to mean that an output shaft formed, in particular, as a crankshaft and flexibly connected to the piston, for example, of the internal combustion engine is driven by the moving motor vehicle, in particular via at least one rotating wheel of the motor vehicle. In doing so, the piston is moved up and down in the cylinder and thus is moved forwards and backwards multiple times alternatingly between the upper dead center and the lower dead center, such that a very large amount of air is usually pumped via the cylinder into and through the exhaust gas tract. Thus, usually during the propulsion operation, the exhaust gas after-treatment element, also called the exhaust gas after-treatment system, which is arranged, for example next to the engine in an engine chamber, in which the internal combustion engine is also arranged, is cleaned with air and thus with oxygen, wherein the air is also called fresh air. In doing so, a catalytically active surface or a volume of the exhaust gas after-treatment element formed as a catalytic converter is filled with oxygen contained in the fresh air.

In order to be able to advantageously convert the engine emissions of the internal combustion engine when reintroducing the fuel supply and combusting in the cylinder and thus to be able to after-treat the exhaust gas, in the exhaust gas after-treatment element formed as a three-way catalytic converter, for example, conditions of a stoichiometric fuel-air mixture, i.e., stoichiometric conditions and thus conditions as are present with a stoichiometric operation of the internal combustion engine, i.e., with an operation of the internal combustion with $\lambda=1$, should be present, in order to set such conditions in the exhaust gas after-treatment element, the internal combustion engine is usually operated on a short-term basis with fuel excess with an activation of the fired operation, following a deactivation of the fired operation, and thus, for example, with a restart, i.e., with hypostoichiometric operation, which is also called rich operation. In the rich operation, $\lambda<1$ applies.

This usually serves to sufficiently remove the oxygen that was received in the exhaust gas after-treatment element and with which the exhaust gas after-treatment element was previously filled from the exhaust gas after-treatment element and thus to virtually empty its oxygen store and in order to fill the exhaust gas after-treatment element with carbon monoxide, for example. This is necessary in order to be able to covert nitrogen oxide emissions, in particular, whose conversion with poor, i.e., hyperstoichiometric conditions ($\lambda>1$) cannot be carried out by means of the three-way catalytic converter. The removal of oxygen from the catalytic convertor is usually also referred to as stripping out the catalytic converter or as catalytic stripping out after propulsion switch-off. Here, the internal combustion engine is hypostoichiometric, i.e., operated richly, until a lambda probe arranged downstream of the exhaust gas after-treatment element registers a jump in its oxygen signal, in particular remaining oxygen signal in the direction of fat, i.e., until the catalytic converter was completely cleaned through by with rich gas. Stripping out the catalytic converter thus reduces an increase of the nitrogen oxide emissions. A complete nitrogen oxide conversion into oxygen, water and carbon dioxide is, however, usually not possible in the event of a restart or with a start of the internal combustion engine, in particular after a washing phase, since the catalytic converter must initially be stripped out after these states, i.e., be set from poor conditions to stoichiometric conditions. Thus, during the rich operation described above and also referred to as the rich phase, nitrogen oxide can usually not be converted by means of the exhaust gas after-treatment element as is desirable and is possible with stoichiometric operation, since, when activating the fired operation or during a period of time immediately after the activation of the fired operation, there is an overabundance of oxygen in the exhaust gas after-treatment element, and there is no carbon monoxide for the nitrogen oxide conversion in the exhaust gas after-treatment element.

This can now be avoided as a result of the method according to the invention since it is possible by means of the method according to the invention, in an operation, in particular in a real operation, of the internal combustion engine, to generate or maintain an at least virtually constant stoichiometric state in the exhaust gas tract or in the exhaust gas after-treatment element, in order to be able to ensure the best possible emission conversions by means of the exhaust gas after-treatment element, in particular also with an activation of the fired operation and immediately after an activation of the fired operation.

The at least virtually constant stoichiometric state mentioned above, which is also called the $\lambda$=1 state, is to be understood, in particular, to mean that stoichiometric conditions ($\lambda$=1) prevail in the exhaust gas tract or in the exhaust gas after-treatment element in the event of an engine start, engine stop, in propulsion operation, during an acceleration phase and during constant driving. This is achieved, in particular, by means of the method according to the invention by cleaning the exhaust gas after-treatment element with fresh air and thus with oxygen from the fresh air being able to be avoided. Thus, filling the exhaust gas after-treatment element with oxygen can be avoided. This means that nitrogen oxides and carbon monoxide can already be sufficiently converted, i.e., transformed, at the point in time of the activation of the fired operation and immediately after the activation of the fired operation by means of the exhaust gas after-treatment element.

Moreover, it is possible by means of the invention to avoid the short-term rich operation described above for stripping out the catalytic converter, whereby a particularly, low-emission and low-filet operation of the internal combustion engine can be achieved. This advantage is based, in particular, on the fact that the rich operation, in particular also when it is carried out only for a short period of time, in comparison to a stoichiometric operation, results in an increase of carbon monoxide and particulate emissions and causes more fuel to be used, which, however, now can be avoided by the method according to the invention. Furthermore, cleaning the exhaust gas tract, also referred to as the exhaust gas system, with fresh air leads to an excessive temperature decrease, in order to lead to a temperature below the starting temperature of the catalytic converter, also referred to as the light-off temperature, in the best case, which can now also be avoided by the method according to the invention. Overall, it can be seen that the usual stripping of the catalytic converter and the disadvantages connected with it can be avoided as a result of the method according to the invention. Consequently, a particularly low-emission operation can be achieved.

The described second position of the valve element formed, for example, as a throttle flap, causes a particular low pressure, for example, that is prevalent in the air pipe and is also referred to as the suction pipe pressure. In particular, the second position, for example, causes the lowest possible pressure in the air pipe, wherein a pressure prevalent in the air pipe is caused or set by the second position to about 200 millibar. In other words, it is preferably provided that a pressure prevalent in the air pipe is set by moving the valve element from the first position into the second position, which ranges from 200 millibar to 350 millibar inclusive and/or still permits or enables a stoichiometric combustion.

The invention is further based on the understanding that the absolute pressure prevalent in the air pipe or in a suction air tract comprising the air pipe of the internal combustion engine is downwardly limited, in particular by an implosion danger of the air pipe, by a danger of limiting the functionality of seals, by a danger of sucking in oil, throttle losses and the situation that the valve element, for example, formed as the throttle flap, cannot completely seal the air pipe in an air-tight manner. In the propulsion operation, the engine achieves very low absolute pressures in the air pipe, which are regulated by the valve element in a region which does not meet a lower absolute pressure limit for the pressure prevalent in the air pipe. As a result of this state, fresh air from the internal combustion engine is usually sucked in and, in particular, sucked into the cylinder, which does not participate in combustion and thus cleans the exhaust gas after-treatment element, attenuates and thus leads to hyperstoichiometric conditions in the exhaust gas after-treatment element. This can now be prevented by means of the method according to the invention, in particular with the aim that only one exhaust gas mass flow flows through the exhaust gas after-treatment, which has previously participated in a stoichiometric combustion or is the result of a stoichiometric combustion. In doing so, an intake of quantities of oxygen into the exhaust gas after-treatment element, which emerge via the remaining oxygen content of an exhaust gas of a stoichiometric combustion, can be prevented or a throughwashing of the exhaust gas after-treatment element with fresh air can be avoided. If the through-washing of the exhaust gas after-treatment element with fresh air in certain operating states of the engine, such as the propulsion operation, with engine start and engine stop, is prevented, the exhaust gas after-treatment element does not have the opportunity to be adjusted from stoichiometric conditions towards emaciation and thus towards hyperstoichiometric conditions. This enables an immediate conversion of untreated exhaust gas emissions of the internal combustion engine when reintroducing the fired operation with stoichiometric mixture, without needing to strip the exhaust gas after-treatment element or its oxygen store in advance. The method according to the invention is thus a technical and applicative measure in order to prevent an excessive intake of oxygen into the exhaust gas after-treatment element preferably formed as a catalytic converter, in particular in all operating states.

In an advantageous embodiment of the invention, it is provided that, in the second step, i.e., in step b), an exhaust cam shaft allocated for actuating at least one exhaust valve allocated to the cylinder is still adjusted in the advance direction in such a way that a valve overlap of the intake valve and the exhaust valve ceases. With this embodiment of the invention, it is particularly possible that as little remaining gas or exhaust gas as possible remains in the cylinder and thus as little remaining gas or exhaust gas as possible of the stoichiometric combustion in the cylinder still taking place during the second step is added, whereby the combustion is held stable in the cylinder.

The exhaust cam shaft adjusted in the advance direction is, in particular in the second step, adjusted in advance or in the advance direction to the extent that the exhaust valve is already closed when the piston reaches its upper dead center. In other words, with a particular advantageous embodiment of the invention, it is provided that, in the exhaust cam shaft adjusted in advance, the exhaust valve is already closed with the piston reaches its upper dead position. Again in other words, as a result of the advance adjustment of the exhaust cam shaft, it is achieved that the exhaust valve, which is actuated, for example, by means of the exhaust cam shaft, reaches its closed position before the piston reaches its upper dead center immediately or directly following the closed position. The feature that the exhaust valve reaches its closed position before the piston reaches its upper dead center immediately or directly following the closed position is to be understood, in particular, to mean that there is no dead center of the piston between the closed position of the valve and the upper dead center directly following this of the piston.

Furthermore, it has been shown to be particularly advantageous when, in the second step, an ignition angle adjustment is carried out in the retarded direction. Alternatively or additionally, in the third step, an ignition angle adjustment is carried out in the retarded direction. If an ignition angle adjustment is carried out in the retarded direction in the second step, for example, and if an ignition angle adjustment is also carried out in the retarded direction in the third step, for example, then the ignition angle is set further in the retarded direction in the third step and in the second step or based on the second step. As the result of such an ignition angle adjustment in the retarded direction, for example, an at least virtually moment-free combustion or an at least virtually moment-free operation of the internal combustion engine can be achieved, such that this releases virtually no moment, for example, via its output shaft, although the fuel supply is still activated during the second step and during the third step and thus the internal combustion engine is still operated in its fired operation during the second step and during the third step despite the detection of the signal. The signal characterizes, for example, the propulsion request described above, thus this propulsion request can be satisfied by the at least virtually moment-free operation in such a way that the internal combustion engine in the second step and in the third step is indeed still in its fired operation, yet no torsional moment is provided for driving the motor vehicle. For example, it is provided in the third step that a or the combustion in the cylinder is carried out with the remaining air load. Since here, for example, a particularly retarded ignition angle is set, the at least virtually moment-free operation described above of the internal combustion engine can be achieved.

In a further embodiment of the invention, the cams for actuating the intake valve are driven by means of an intake cam shaft of the internal combustion engine, whereby, the intake valve is actuated. In other words, the intake cam shaft is formed for actuating the intake valve. Here, the cams, for example, are rotationally fixedly connected to the intake cam shaft and can thus be driven by it. Here, it has been shown to be particularly advantageous when, in the third step (step c), the intake cam shaft formed to drive the cams and thus to actuate the intake valve is adjusted in the advance direction. For example, a phase adjustment of the intake cam shaft to its most advanced position is carried out. In other words, the reference position of the intake cam shaft, for example, is the most advanced stop position of the intake cam shaft. The intake cam shaft is regulated, for example, in terms of its phase adjustment to the reference position, i.e., to the most advanced stop position of the intake cam shaft, in order to ensure a sufficient amount of air for a stoichiometric combustion, in particular for or in an idling operation of the internal combustion engine.

The reduction of the air intake into the cylinder resulting from the switching from the first cam to the second cam is to be understood, in particular, as the following: if the intake valve is actuated, for example, by means of the first cam, then the intake valve is actuated according to a first valve elevation curve, which describes a first movement caused by the first cam or a first movement course caused by the first cam of the intake valve. If the intake valve is actuated by means of the second cam, then the intake valve is actuated according to a second valve elevation curve different from the first valve elevation curve. The second valve elevation curve here describes a second movement of the intake valve different from the first movement or a second movement course of the intake valve different from the first movement course, wherein the second movement or the second movement course is caused by the second cam. If, for example, the valve elevation curves are depicted in one diagram each or in one common diagram, on whose x-axis rotational positions of the output shaft are plotted, whose rotational positions are also called gradient curve angles, in particular when the output shaft is called the crankshaft, then the respective integral or the respective surface area below the respective valve elevation curve in particular during the movement of the piston from its upper dead center into its lower dead center is a measure for the amount of air that the intake valve allows to flow into the cylinder, in particular during the movement of the piston in the direction of its upper dead center. Since the second cam in comparison to the first cam causes a reduction of the air intake, the surface area below the second valve elevation curve is smaller than the surface area below the first valve elevation curve.

In a further embodiment of the invention, after the third step (step c), the intake cam shaft and thus the second cam is adjusted in the retarded direction. In doing so, an excessive cleaning of the exhaust gas tract of the exhaust gas after-treatment with fresh air can be avoided.

In order to achieve a particularly low-emission operation, it is provided in a further embodiment of the invention that, as a result of this adjustment of the intake cam shaft and thus the second cam, air later flowing out of the cylinder into the cylinder is shifted back into the air pipe from the cylinder by means of the piston via the opened intake valve.

In has furthermore been shown to be advantageous when, after the third step, in particular after a work play of the internal combustion engine following on from the third step, the fuel supply (fuel feed) is switched off depending on the detection of the signal, i.e., is deactivated. Here, the actual activation of the propulsion operation or the propulsion switch-off is thus carried out, wherein it is preferably provided that the fuel supply is, however, deactivated as a result of the detection of the signal only after the implementation of the second step and the third step. Thus, for example, the second step and the third step or their implementation lies temporally between the detection of the signal and the actual deactivation of the fuel supply.

It has furthermore been shown to the particularly advantageous when, after the third step, the valve element is moved into a third position different from the first position and the second position, which causes a third value of the flow cross-section that is smaller in comparison to the second value. The third position is, for example, a closed position of the valve element, which reduces the flow cross-section in the third position as much as possible example, the air pipe in the third position of the valve element is fluidically blocked by means of the valve element, where necessary except for any leaks. In particular, the third position can be a maximum closed position of the valve element.

Finally, it has proved to be particularly advantageous when a decompression cam or an early-intake-closed cam (FES cam) causing earlier closing of the intake valve in comparison to the first cam is used as the second cam. The point in time or the rotational position of the output shaft formed as a crankshaft, or also which closes the exhaust valve and thus reaches its closed position, is also called intake closed (ES). Here, the FES cam is, for example, a cam that causes such a valve elevation curve, in which intake closed is in front of the lower dead center of the piston. In particular, intake closed of the second cam or the intake closed caused by the second cam is in front of the intake closed of the first cam or in front of the intake closed caused by the first cam. Alternatively or additionally, it is provided, for example, that the intake valve carries out a low stroke by means of the actuation of the second cam in comparison to the actuation by the first cam and/or is opened in a lower rotational or angle region of the crankshaft.

In the method according to the invention, in particular in the second step, a greater amount of fresh air is sucked or introduced into the cylinder as a result of the movement of the valve element from a first position into a second position caused by a second value of the flow cross-section that is lower in comparison to the first value, than is pressed back into the air pipe from the cylinder. The air pipe is thus refilled from behind with air from the cylinder, and this air is shifted forwards and backwards again and again, yet not pressed into the exhaust. By carrying out the third step, the valve elevation curve, for example, is adjusted in the retarded direction or the intake cam shaft is adjusted in the retarded direction to such an extent that the intake valve is only raised shortly before until shortly after the lower dead center, such that less air is sucked in as a result of the third step or sucked into the cylinder or let in than is pressed back into the air pipe.

As soon as a load request, for example, i.e., an in particular electrical signal for activating the fired operation and thus for deactivating the propulsion operation, is detected, in particular by means of the electronic calculating device, the method or the described steps takes or take place in the opposite sequence, and the fired operation is activated. Ending or deactivating the fuel supply is accompanied, for example, by a deactivation of the ignition or the ignition device, such that the provision of sparkplugs caused by the ignition device is also deactivated as a result of the deactivation of the fuel supply. In particular, it is possible as part of the method according to the invention to use a standard cam, a plateau cam or a shortened cam as the exhaust cam for actuating the exhaust valve, wherein the exhaust cam can be driven by the exhaust cam shaft.

Further advantages, features and details of the invention emerge from the description below of preferred exemplary embodiments and by means of the drawings. The features mentioned above in the description and feature combinations and the features mentioned in the description of the Figures and/or shown on their own in the Figures and feature combinations can not only be used in the respectively specified combination but also in other combinations or individually, without leaving the scope of the invention.

DETAILED DESCRIPTION OF THE DRAWINGS

Figure 1:
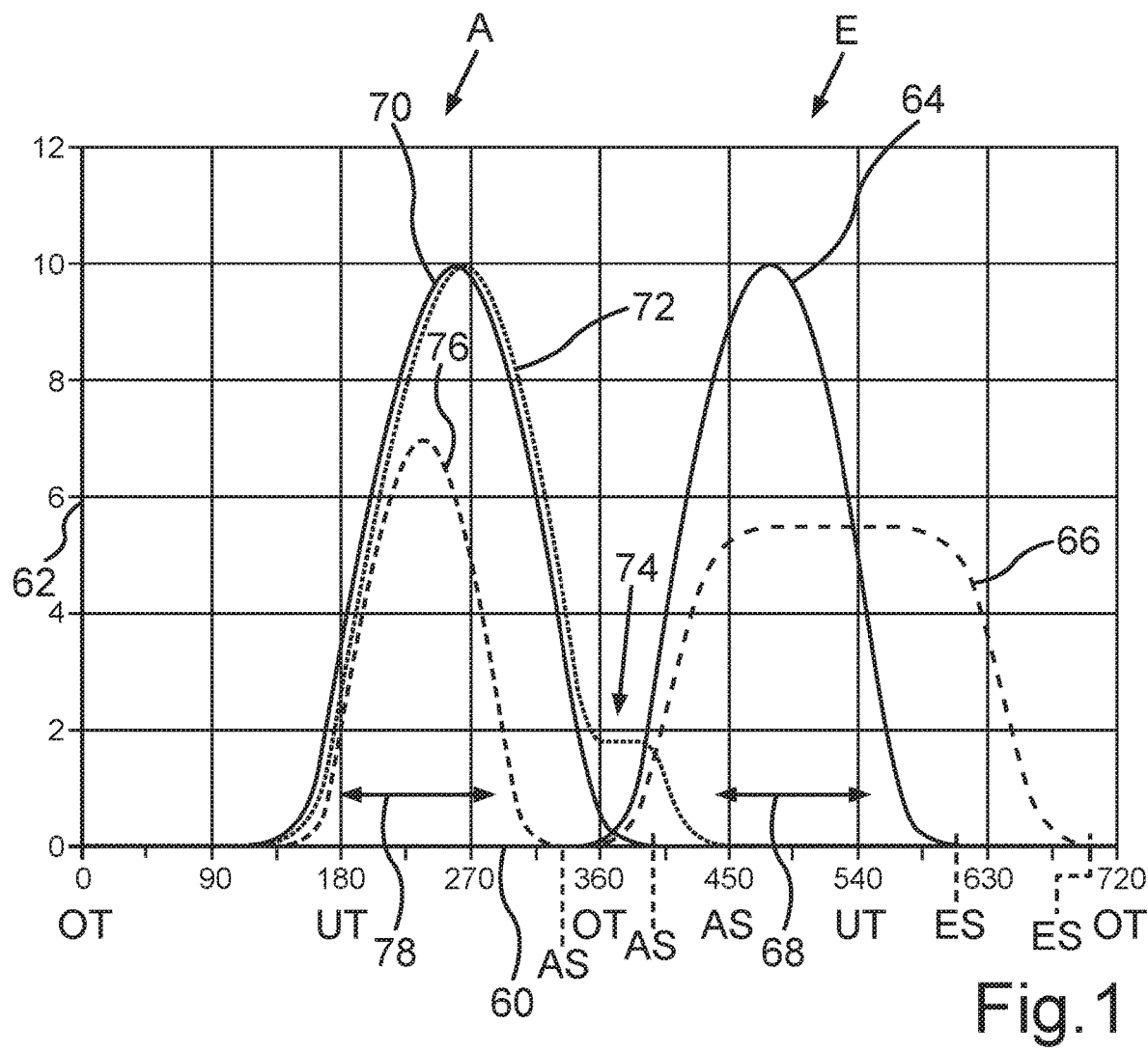
FIG. 1 is a diagram for illustrating different embodiments of a method according to the invention for operating an internal combustion engine of a motor vehicle.
Figure 2:
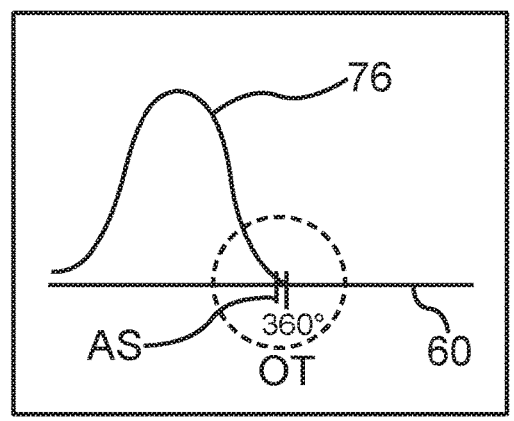
FIG. 2 is a diagram for further illustrating the method.

In the Figures, the same or functionally identical elements are provided with the same reference numerals.

Below, by means of FIG. 1 to FIG. 9, a method for operating an internal combustion engine 10 than can be seen sectionally in FIG. 7 of a motor vehicle, in particular a motor car, is illustrated. In particular, it can be seen in FIG. 7 that the internal combustion engine 10 has an intake side E, on which a suction tract 12, also called an intake tract of the internal combustion engine 10, is arranged. The suction tract 12 comprises at least one air pipe 14 that can be flowed through by air, which is also referred to as a suction pipe, suck pipe, air distributor, air guiding element or similar. The internal combustion engine 10 is formed as a reciprocating piston engine, for example, and has an engine housing 16 formed as crank housing, in particular as a cylinder crank housing, with which at least one combustion chamber is formed in the shape of a cylinder 18 of the internal combustion engine 10. The air pipe 14 can be flowed through by air 20 schematically depicted in FIG. 7 in particular, wherein in particular during an operation, in particular during a fired operation, of the internal combustion engine 10, the air flowing through the air pipe 14 is led to and, in particular, into the cylinder by means of the air pipe 14. In other words, at least the air 20 flowing through the air pipe 14 can be supplied to the cylinder 18 by means of the air pipe 14.

During the fired operation, the cylinder 18 is supplied with the air 20 and with fuel for operating the internal combustion engine 10 in the fired operation. During the fired operation, the air 20 and the in particular liquid or gaseous fuel form a mixture also called fuel-air mixture in the cylinder 18, which mixture is ignited and subsequently combusted. This results in exhaust gas, which can flow out of the cylinder 18 on the exhaust side A and into an exhaust gas tract 22 of the internal combustion engine 10. The internal combustion engine 10 here also comprises a piston 24, which is translationally moveably received in the cylinder 18. The piston 24 is flexibly coupled to an output shaft 28, formed as a crankshaft, of the internal combustion engine 10 via a conrod 26, wherein the output shaft 28 can be rotated around a rotational axis 30 relative to the engine housing 16. In doing so, the output shaft 28 can be rotated into different rotational positions, which are also referred to as degrees of crank angles, A working cycle of the internal combustion engine 10 comprises, for example, exactly two complete rotations of the output shaft 28 and thus 720 degrees of crank angle.

The fuel air mixture in the cylinder 18 is ignited, for example, by means of an outside ignition device 32, formed as a spark plug, of the internal combustion engine 10 at a predeterminable ignition point in time. The ignition point in time here corresponds to one of the rotational positions of the output shaft 28, wherein the rotational position which the output shaft 28 is in when the mixture is ignited is also called the ignition angle. The ignition angle can be adjusted. This means that the ignition angle can be varied or changed.

Furthermore, the internal combustion engine 10 has at least one intake valve 34 allocated to the cylinder 18, wherein several and here at least or exactly two intake valves can be allocated to the cylinder 18. It can be seen in FIG. 7 that the intake valve 34 is allocated to an intake channel 36, into which the air pipe 14 opens out. The intake valve 34 can be moved, in particular translationally and/or relatively to the engine housing 16, between at least one open position shown in FIG. 7 and a closed position. To do so, a first cam shaft, for example, in the form of an intake cam shaft 38 is allocated to the intake valve 34, by means of which the intake valve 34 can be actuated and thus can be moved from the closed position into the open position. The intake cam shaft 38 is at least indirectly coupled to the output shaft 28 and thus can be driven by the output shaft 28. In particular, the internal combustion engine 10 also comprises a first cam 40 and a second cam 42, by means of which the intake valve 34 can be respectively actuated and thus can be moved from the closed position into the open position or into respective open positions. The cams 40 and 42 are connected, for example, rotationally fixedly to the intake cam shaft 38 and thus can be driven by the intake cam shaft 38.

In the closed position, the intake valve 34, for example, closes the intake channel 36, such that no air can flow from the intake channel 36 into the cylinder 18 or vice versa such that no air can flow from the cylinder 18 into the intake channel 36. In the respective open position, the intake valve 34 releases the intake channel 36, such that at least air, for example, can flow from the intake channel 36 into the cylinder 18 or vice versa can flow from the cylinder 18 into the intake channel 36.

Moreover, the internal combustion engine 10 comprises at least one valve element in the form of a throttle flap 44, which is arranged in the suction tract 12, in particular in the air pipe 14. The throttle flap 44 can be pivoted, for example, around a pivot axis 46 relative to the air pipe 14 and thus can be moved relative to the air pipe 14. A flow cross-section 48 of the suction tract 12, in particular of the air pipe 14, which can be flowed through by the air flowing through the suction pipe 14, can be set. The internal combustion engine 10 further comprises at least one exhaust valve 50 allocated to the cylinder 18, which can be moved, for example, in particular translationally and/or relatively to the engine housing 18, between a closed position shown in FIG. 7 and at least one open position or several open positions. In the closed position, the exhaust valve 50 blocks an exhaust channel 52 allocated to the exhaust valve 50, which belongs to the exhaust gas tract 20, for example. Thus, in the closed position of the exhaust valve 50, no gas, in particular no exhaust gas, can flow out of the cylinder 18 into the exhaust gas tract 20 or vice versa. In the open position, the exhaust valve 50 releases the exhaust channel 52, for example, such that exhaust gas can then flow out of the cylinder 18 into the exhaust gas tract 22 or vice versa.

The internal combustion engine 10 further comprises an exhaust cam shaft 54 allocated to the exhaust valve 50, by means of which the exhaust valve 50 can be actuated and can thus be moved out of the closed position, for example, into the open position of the exhaust valve 50. The exhaust cam shaft 54 is also coupled at least indirectly to the output shaft 28 and thus can be driven by the output shaft 28, such that respective positions, for example, and in particular the respective open and closed positions of the intake valve 34 and the exhaust valve 50 correspond to respective rotational positions or degrees of crank angle of the output shaft 28. Furthermore, the internal combustion engine 10 comprises at least one exhaust gas after-treatment element 56 arranged in the exhaust gas tract 22, which can be flowed through by the exhaust gas and is formed for the after-treatment of the exhaust gas. The exhaust gas after-treatment element 56 is formed, for example, as a catalytic converter, in particular as a three-way catalytic converter.

During the fired operation of the internal combustion engine 10, it is operated stoichiometrically, i.e., with a stoichiometric mixture, such that the combustion air ratio (λ) is at least substantially 1. If there are stoichiometric conditions present for the exhaust gas after-treatment element 56, i.e., such conditions which are the result of the stoichiometric operation of the internal combustion engine 10, then the exhaust gas after-treatment element 56 (catalytic converter) can particularly advantageously after-treat the exhaust gas. In particular, the catalytic converter can particularly advantageously convert any nitrogen oxides contained in the exhaust gas, i.e., transform them with carbon monoxide into nitrogen and carbon dioxide.

As part of the method for operating the internal combustion engine 10, the internal combustion engine 10 is initially operated in its fired operation, during which combustions or combustion processes are carried out in the cylinder 18, as part of which respective fuel-air mixtures are formed, ignited and combusted.

Figure 7:
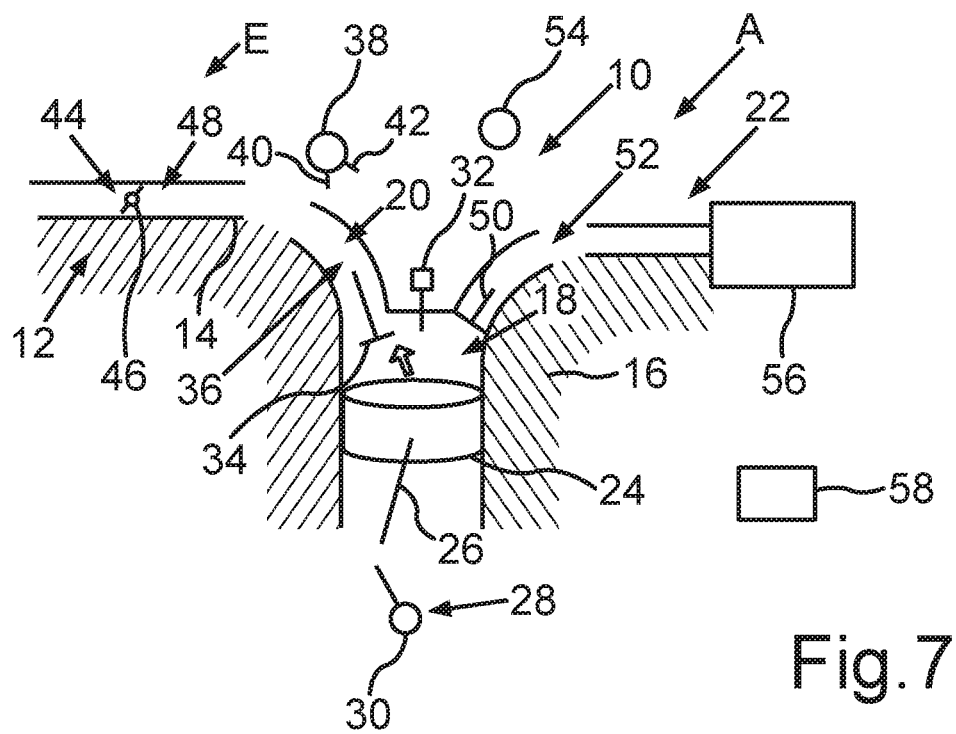
FIG. 7, sectionally, shows a schematic and sectional side view of the internal combustion engine.

In a first step of the method, an in particular electrical signal for causing a fuel supply of the cylinder 18 to switch off is detected by means of an electronic computing device 58, in particular schematically depicted in FIG. 7, of the internal combustion engine 10. The electronic computing device 58 is also called the control device. The fuel supply of the cylinder 18 is to be understood to mean a fuel feed in the cylinder 18, such that when the fuel supply of the cylinder 18 is activated, the cylinder 18 is supplied with the fuel mentioned above in other words, if the fuel supply of the cylinder 18, i.e., the fuel feed, is activated, then the cylinder 18 is supplied with the fuel during a period of time in which the fuel supply is activated. To do so, the fuel is introduced into the cylinder 18, in particular directly injected.

The period of time during which the filet supply of the cylinder 18 is activated comprises, for example, several first time intervals, during which the fuel is actually introduced, in particular directly injected, into the cylinder 18. Furthermore, the period of time during which the fuel supply is activated comprises, for example, second time intervals lying between the first time intervals, in which an introduction of fuel into the cylinder 18 ceases. The fuel supply thus takes place during the fired operation, wherein the fired operation is ended by the fuel supply being deactivated, i.e., switched off. Again in other words, the period of time in which the fuel supply of the cylinder 18 is activated is accompanied by the fired operation of the internal combustion engine 10, wherein a second period of time in which the fuel supply is deactivated or switched off is accompanied by a non-fired operation of the internal combustion engine 10, wherein, during the non-fired operation, combustion processes in the internal combustion engine 10 or in the cylinder 18 cease. The signal mentioned above is used here in order to end the fuel supply and thus the fired operation or to introduce such an end of the fired operation. The signal is, for example, a propulsion request, in order to transfer the internal combustion engine 10 from its fired operation and thus from its tensile operation into its propulsion operation, during which combustion processes in the cylinder cease. Furthermore, the signal can be a switch-off request in order to park the internal combustion engine 10 completely, i.e., to deactivate it, whereupon combustion processes in the cylinder 18 cease.

In a second step of the method, the throttle flap 44 is moved from a first position triggering a first value of the flow cross-section 48 into a second position triggering a second value that is lower in comparison to the first value, while the fuel supply of the cylinder is still activated and the intake valve 34 is actuated by means of the first cam 40. Here, the first step is carried out as a result of the detection of the signal. This means that, despite detecting the signal for causing the switching off of the fuel supply of the cylinder 18, the fuel supply of the cylinder 18 is still activated during the second step. Here, during the second step, the first cam 40 and not the second cam 42 is allocated to the intake valve, such that the intake valve 34 is actuated by means of the first cam 40, yet not by means of the second cam 42.

In a third step of the method, while the fuel supply of the cylinder 18 is still activated, it is switched from a first cam 40 to the second cam 42, wherein the third step is carried out as a result of detecting the signal. Thus, despite the detection of the signal for causing the switching off of the fuel supply, the fuel supply is still also activated during the third step. In other words, the second step and the third step follow on from the detection of the signal, or the second step and the third step are the result of the detection of the signal, yet the fuel supply is still activated during the second step and during the third step. As a result of switching from the cam 40 to the cam 42, the intake valve 34 is actuated by means of the cam 42 in such a way that the intake valve 34 causes a reduced air intake in comparison to the actuation of the intake valve 34 caused before by means of the first cam 40. This reduced air intake is explained in more detail below.

The intake valve 34 and the exhaust valve 50 are gas exchange valves or are also referred to as gas exchange valves. In the event of the respective movement from the respective closed position into the respective open position, the respective gas exchange valve implements a stroke, which is also referred to as a valve stroke. The respective cam 40 or 42 is referred to, for example, as an intake cam. Furthermore, at least one exhaust cam is provided, by means of which the exhaust valve 50 can be actuated and thus can be moved from the closed position into the open position. The exhaust cam is connected, in particular rotationally fixedly, to the exhaust cam shaft 54 and thus can be driven by this. It is conceivable that several exhaust cams are provided, between which it can be switched, such that the exhaust valve 50 can be selectively actuated by means of a first or by means of a second of the exhaust cams.

FIG. 1 shows a diagram on whose x-axis 60 the rotational positions of the output shaft 28 and thus degree of crank angle are plotted. On the y-axis 62 of the diagram, the respective valve stroke is plotted. In the diagram shown in FIG. 1, a first valve elevation curve 64 is recorded, according to which the intake valve 34 is moved or actuated, when the intake valve 34 is actuated by means of the first cam 50. In other words, the cam 40 actuates the valve elevation curve 64, for example. Here, the cam 40 is formed, for example, as a so-called reference or standard cam.

In the diagram shown in FIG. 1, a second valve elevation curve 66 is recorded, according to which the intake valve 34 is actuated or moved when the intake valve 34 is actuated or moved by means of the second cam 42. This means that the cam 42 causes the valve elevation curve 66. The cam 42 is designed as a decompression cam in FIG. 1, It can be seen in FIG. 1 that the valve elevation curves 64 and 66 differ in terms of the valve stroke of the intake valve 34 and in the rotational positions of the output shaft 28, at which the intake valve 34 reaches its closed position. The rotational position which the output shaft 28 is in when the intake valve 34 reaches it closed position is also referred to as intake closed ES.

A cam shaft control is allocated to the intake cam shaft 38, by means of which the intake cam shaft 38 and thus also the cams 40 and 42 can be rotated in relation to the output shaft 28. This rotation of the intake cam shaft 38 relative to the output shaft 28 is also referred to as phase adjustment or cam shaft phase adjustment of the intake cam shaft 38, wherein this cam shaft phase adjustment of the intake cam shaft 38 is illustrated in FIG. 1 by a double arrow 68. Moreover, in the diagram shown in FIG. 1, a valve elevation curve 70 is recorded, which describes the actuation or movement of the exhaust valve 50, when the exhaust valve 50 is actuated by means of the first exhaust cam. In other words, the exhaust valve 50 is actuated or moved according to the valve elevation curve 70, when the exhaust valve 50 is actuated by means of the first exhaust cam. The first exhaust cam causing the valve elevation curve 70 is an exhaust standard cam or is referred to as an exhaust standard cam.

In the diagram shown in FIG. 1, a second valve elevation curve 72 is further recorded, according to which the exhaust valve 50 is moved or actuated when the exhaust valve 50 is actuated by means of the second cam. The second cam, which causes the valve elevation curve 72, is formed as a so-called plateau cam or exhaust plateau cam, since the valve elevation curve 72 has a plateau 74. During the plateau 74, the exhaust valve 50 is in an intermediary position lying between the closed position and the open position while a plurality of successive rotational positions of the output shaft 28 is uninterrupted, in particular constant.

The rotational position which the output shaft 28 is in when the exhaust valve 50 reaches its closed position is also referred to as exhaust closed AS. Here, the valve elevation curves 70 and 72 do not differ in terms of the valve stroke, for example, of the exhaust valve 50 but in terms of the respective exhaust closed AS, for example. It can be seen in FIG. 1 that the intake closed ES of the valve elevation curve 64 is in advance of the intake closed ES of the valve elevation curve 66. Furthermore, the exhaust closed AS of the valve elevation curve 70 is in advance of the exhaust closed AS of the valve elevation curve 72.

Moreover, a valve elevation curve 76 is recorded in the diagram shown in FIG. 1, which is caused, for example, by the second exhaust cam or by a third exhaust cam. The third exhaust cam is additionally used, for example, for the first exhaust cam and for the second exhaust cam, wherein the first exhaust cam, the second exhaust cam and the third exhaust cam are rotationally fixedly connected to the exhaust cam shaft 54. Furthermore, it is conceivable that the third exhaust cam is used instead of the second exhaust cam, such that then either the first exhaust cam and the second exhaust cam or the first exhaust cam and the third exhaust cam are rotationally fixedly connected to the exhaust cam shaft 54. The exhaust valve 50 is thus moved or actuated according to the valve elevation curve 76 when the exhaust valve 50 is actuated by means of the third exhaust cam. The valve elevation curve 76 differs, in particular, from the valve elevation curve 70 and 72 in terms of the valve stroke of the exhaust valve 50. Furthermore, the exhaust closed AS of the valve elevation curve 76 is in advance of the respective exhaust closed AS of the valve elevation curves 70 and 72.

Moreover, it is conceivable that a second cam shaft control is allocated to the exhaust cam shaft, by means of which the exhaust cam shaft 54 can be rotated in relation to the output shaft 28. This rotation of the exhaust cam shaft 54 relative to the output shaft 28 is also referred to as phase adjustment or cam shaft phase adjustment of the exhaust cam shaft 54, wherein this cam shaft phase adjustment of the exhaust cam shaft 54 is illustrated by a double arrow 78 in FIG. 1. The respective intake closed ES or the respective exhaust closed AS can be varied or adjusted by the respective phase adjustment of the intake cam shaft 38 or the exhaust cam shaft 54. An adjustment of the intake cam shaft 38 or the exhaust cam shaft 54, which are together referred to as cam shafts, in the advance direction means that the exhaust closed AS or the intake closed ES is set at earlier points in time or at lower rotational positions or degree crank shaft angles. A corresponding adjustment of the respective cam shaft in the retarded direction means that the exhaust closed AS or the intake closed ES is set at greater rotational positions or degrees of crank angle, i.e., up to higher values of the degree of crank angle.

Moreover, the upper dead center of the piston 24 is labelled with OT, wherein the lower dead center of the piston 24 is labelled with UT. Exactly one working cycle of the internal combustion engine 10 here comprises exactly two complete rotations of the output shaft 28 and thus 720 degrees of crank angle, which are plotted on the x-axis 60. Within such a working cycle, the piston 24 is moved exactly twice out of its upper dead center into the lower dead center and out of its lower dead center into the upper dead center. The internal combustion engine 10 is here formed, in particular, as a four-stroke internal combustion engine, or four-stroke engine.

Thus, the signal can characterize, for example, a stroke request and a stop request for stopping or switching off the fired operation or the internal combustion engine 10 overall. Since the fuel supply of the cylinder 18 is maintained or is still activated during the second step and during the third step, the internal combustion engine 10 or its fired operation runs during the second step and during the third step, in particular despite detecting the signal. Furthermore, initially in the second step, the standard cam is maintained.

Furthermore, it is preferably provided in the second step that the exhaust cam shaft 54 is set, in particular regulated, in the advance direction by means of the cam shaft control allocated to the exhaust cam shaft 54, wherein the position of the exhaust cam shaft 54 in relation to the intake cam shaft is set in such a way that no valve overlap is present in this most advanced stop position of the exhaust cam shaft 54, as little residue gas, i.e., exhaust gas, as possible remains in the cylinder 18. In other words, with the exhaust cam shaft set in the advance direction, as little residue gas as possible is added to the respective stoichiometric combustion taking place in the cylinder 18, in order to thus keep the combustion stable. The exhaust cam shaft 54 should be adjusted so far in the advance direction that the exhaust valve 50 is closed, i.e., is in its closed position, when the piston 24 reaches its upper dead position. This can be seen particularly well in FIG. 2. The exhaust closed AS lies before the upper dead center OT as a result of the cam shaft phase adjustment of the exhaust cam shaft 54, which is coupled immediately or directly to the exhaust closed AS. As already indicated, the second cam 42 is a decompression cam. The method is described below by means of the decompression cam.

In the third step, a switch from the first cam 40 to the second cam 42 formed as a decompression cam is carried out. In the third step, it is provided that the intake cam shaft 38 is set in the advance direction or regulated by its cam shaft phase adjustment to the extent that exactly enough air reaches or remains in the cylinder 18 that a stoichiometric combustion, in particular when the internal combustion engine is idling, can be maintained, yet here without releasing a moment onto the crank shaft 28.

The position or the degree of crank angle, in which the intake valve 34 begins to open or in which the movement of the intake valve 34 from the closed position into the open position begins, is labelled with intake open EÖ. The intake open EÖ is shown, for example, in FIG. 3. Here, in FIG. 3, a first area F1 is also shown below the valve elevation curve 64, wherein the area F1 is depicted hatched in FIG. 3. Moreover, in FIG. 3, an area F2 is shown under the valve elevation curve 66. The area F1 characterizes a first amount of air, which can flow into the cylinder 18 from the air pipe 14, when the intake valve 34 is actuated according to the valve elevation curve 64 and thus by means of the cam 40. In comparison, the second area F2 characterizes an amount of air which can flow out of the air pipe 14 into the cylinder 18 when the intake valve 34 is actuated by means of the valve elevation curve 66 and thus by means of the decompression cam 42. The respective area F1 or F2 extends from the intake open EÖ to the lower dead center UT, attached directly thereto, of the piston 24 and, where necessary, in a region in which the piston 24 moves in the direction of its lower dead center UT or into the upper dead position UT, since air can only flow out of the air pipe 14 and into the cylinder 18 while the intake valve 34 is open and when the piston 24 moves in the direction of the lower dead center UT, since then the piston 24 sucks in the air in the cylinder 18. The second area F2 is also hatched, wherein, in FIG. 3, lines of the hatching of the first area. F1 run from bottom left to top right in relation to the image plane of FIG. 3, and wherein lines of the hatching of the area F2 run from top left to bottom right in relation to the image plane of FIG. 3, Thus, in FIG. 3, a cross hatching characterizing or illustrating the area F2 emerges, in which the lines of the hatching of the area F1 and lines of the hatching of the area F2 cross over. As can clearly be seen in FIG. 3, the area F2 is smaller than the area F1, such that, in particular under the same conditions such as, for example, pressure prevailing in the air pipe 14, a temperature of the air received in the air pipe 14 and rotational speed and/or load of the internal combustion engine 10, the actuation of the intake valve 34 caused by means of the cam 42 in comparison to the actuation of the intake valve 34 caused by means of the cam 40 allows a smaller amount of air to flow into the cylinder 18. The cam 42, i.e., the decompression cam, is thus a cam reducing air intake. In other words, it can be seen in FIG. 3 that the area F2 caused by the decompression cam for sucking in the air is smaller than the area F1 caused by the standard cam, also called the reference cam. The intake cam shaft 38 is therefore set so far in the advance direction in the third step of the method that a stable stoichiometric combustion is still possible; this is more sophisticated than when actuating the intake valve 34 by means of the standard cam. The respective area F1 or F2 extends, for example, up to the lower dead center UT, which is attached immediately or directly to the intake open, since air can no longer be sucked in and thus sucked into the cylinder 18 after the piston 24 has reached its upper dead center UT.

Figure 3:
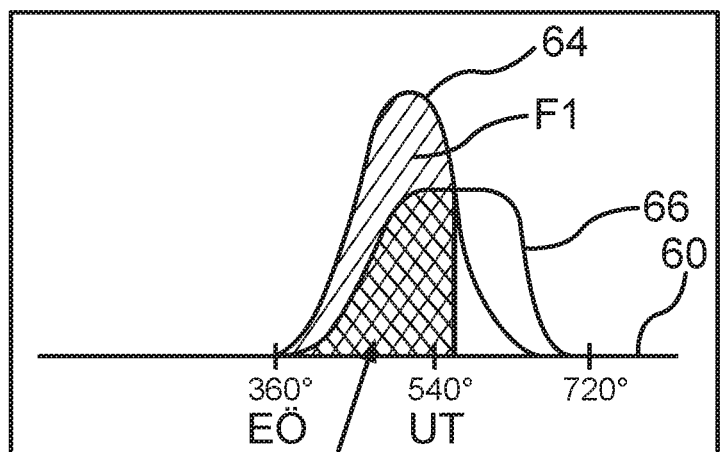
FIG. 3 is a diagram for further illustrating the method.
Figure 4:
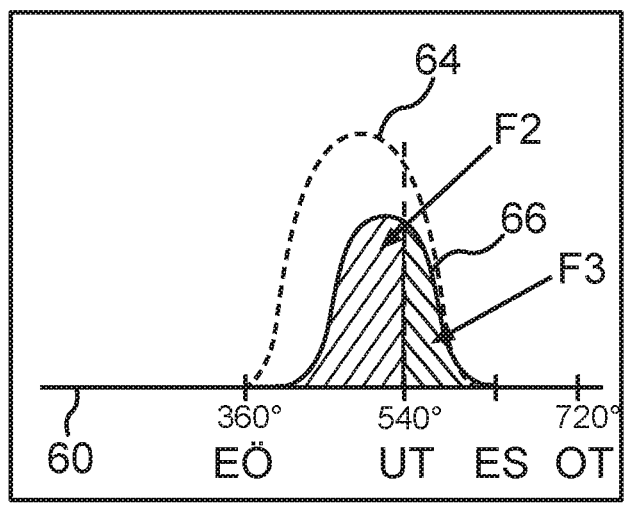
FIG. 4 is a diagram for further illustrating the method.
Figure 4:
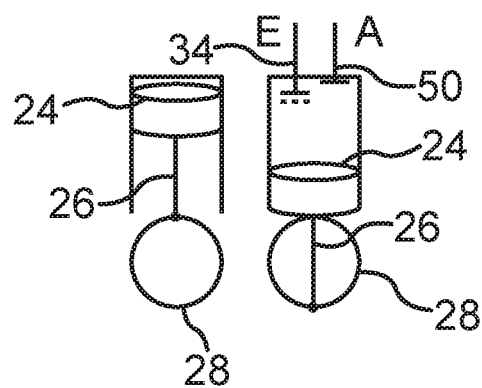

As can be seen in FIG. 3, in the lower dead center UT attached immediately to the intake open EÖ, the intake valve 34 is still open, which is also depicted in FIG. 4. Following the lower dead center UT, the piston 24 again moves in the direction of its upper dead center OT. Since the intake valve 34 is still open after the lower dead center UT, when moving the piston 24 in the direction of the upper dead center OT, air and thus oxygen contained in the air is pumped again out of the cylinder 18 back into the intake channel 36 and thus into the air pipe 14.

Furthermore, it can be seen particularly well in FIG. 4 that the area F2 extends from the intake open EÖ up to the lower dead center UT at 540 degrees of crank angle. Here, in FIG. 4, a further hatched area F3 is shown, which extends from the lower dead center UT at 540 degrees of crank angle to the intake closed ES. The area F3 below the valve elevation curve 66 characterizes an amount of air which, when the piston 24 moves from the lower dead center UT at 540 degrees of crank angle to the intake closed ES, is conveyed by means of the piston 24 out of the cylinder 18 back into the intake channel 36 or can belong to the air pipe 14. Here, the area F3 is smaller than the area F2. This means that the amount of air, which is pumped back into the air pipe 14 from the cylinder 18 by means of the piston 24, is smaller than the amount of air which was previously sucked into the cylinder 18, in particular between intake open EÖ and the lower dead center UT at 540 degrees of crank angle. This means that of the sucked-in air, i.e., sucked into the cylinder 18, which is also referred to as air filling, not all of it is pumped back into the air pipe 14, such that, of the air which was previously sucked into the cylinder 18, a first part is pumped back into the air pipe 14, and a second part remains in the cylinder 18, wherein the second part of a stoichiometric combustion is available in the cylinder 18.

Switching from the cam 40 to the cam 42 or vice versa is also called valve switching or valve stroke switching, in particular due to the fact that the valve elevation curves 64 and 66 differ from one another in terms of stroke of the intake valve 34. During or in the valve switching, moment neutrality must be taken into consideration. This can be advantageous in order to ensure a mechanical switching from the cam 40 to the cam 42 without a jolt of the drive train than can be felt by the driver. This can take place, for example, by an ignition angle action in the retarded direction, i.e., late ignition. In other words, it is preferably provided that an adjustment of the ignition angle in the retarded direction, i.e., to larger degrees of crank angle, is carried out in the second step and/or in the third step.

Figure 5:
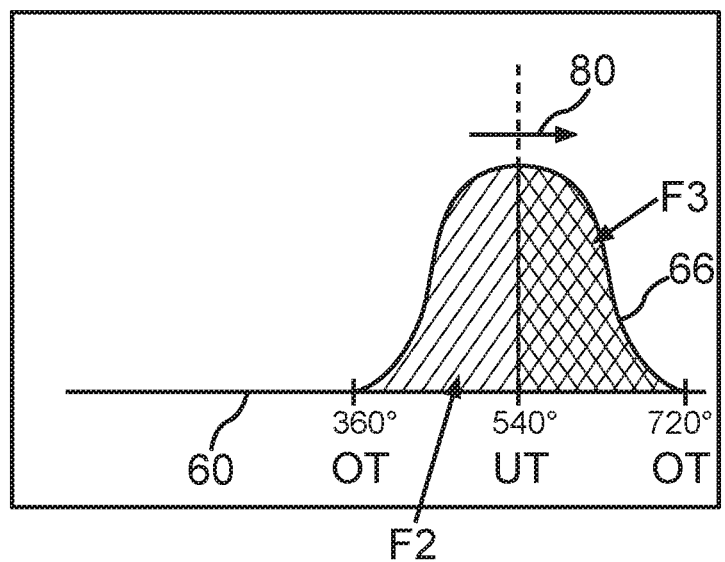
FIG. 5 is a diagram for further illustrating the method.

Furthermore, it is provided that, after the third step, in particular after a working cycle of the internal combustion engine 10 following the third step, the intake cam shaft 38 is advantageously adjusted to such an extent or in the retarded direction that the area characterizing the sucked-in air, such as the area F2, for example, is the same or smaller than the area F3, which characterizes the amount of air that is pumped back into the air pipe 14. In FIG. 5, an arrow 80 illustrates the described adjustment of the intake cam shaft 38 in the retarded direction. In FIG. 5, it is further illustrated that the areas F2 and F3 are at least substantially the same. In other words, according to FIG. 5, the following applies: F2=F3. By adjusting the intake cam shaft 38 in the retarded direction after the third step, the sucked-in air is also shifted out of the air pipe 14 back into the air pipe and not later into the exhaust gas tract 22 via the exhaust valve. Thus, it can advantageously at least extensively be avoided that the oxygen in the air reaches the exhaust gas after-treatment element 56.

Figure 6:
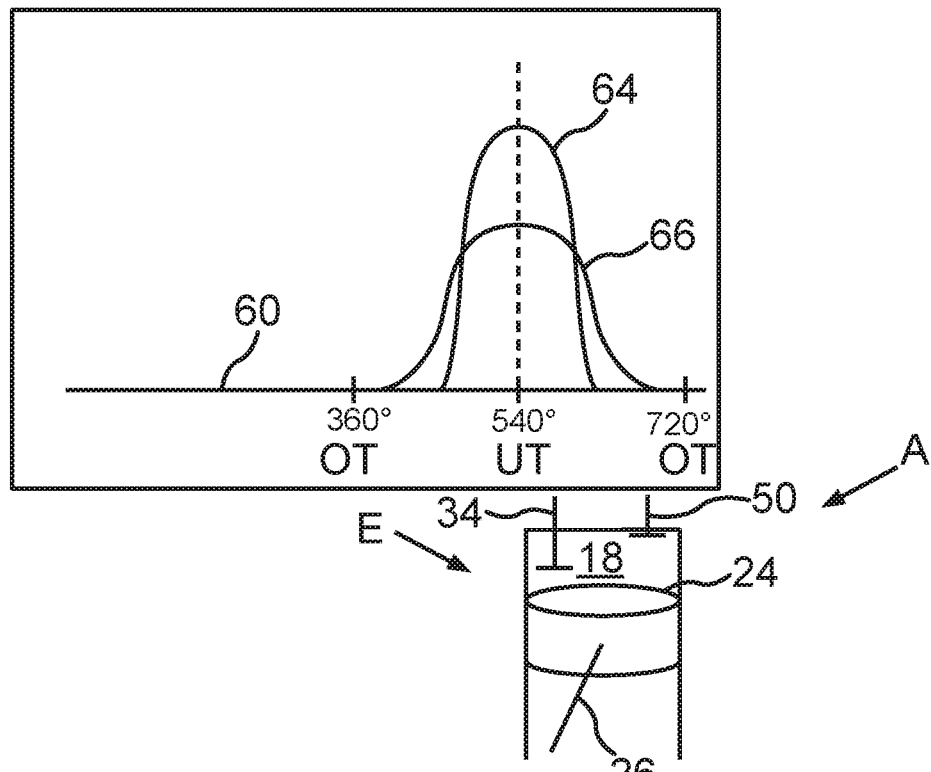
FIG. 6 is a diagram for further illustrating the method.

A further advantage of switching from the cam 40 to the cam 42 is that the cam shaft phase adjustment also simply called cam shaft adjustment is possible in the very retarded position, without the piston 24 touching or damaging the intake valve 34, which is illustrated in FIG. 6. For example, FIG. 6 shows that the piston 24 is in its upper dead center OT, while the intake valve 34 is open and is in its maximum open position or implements its maximum stroke than can be caused by means of the cam 42. Here, a contact between the piston 24 and the intake valve 34 ceases. The exhaust valve 50 is in its closed position. In doing so, a greater amount of air can be pumped on the intake side E and thus into the air pipe 14 than is possible by means of the conventional standard cam. In doing so, a greater pressure increase of the pressure prevailing in the air pipe 14 of about 200 millibar is possible in the direction of the surrounding pressure.

After a retarded adjustment of the intake cam shaft 38, the throttle flap 44 is advantageously completely closed, i.e., moved into its maximum closed position, which is illustrated in FIG. 7. Here, in particular at the same moment, the fuel supply is deactivated. A complete closure of the throttle flap is here to be understood to mean that the throttle flap 44 is closed as tightly as possible or as extensively as possible in order to block the air pipe 14 as tightly as possible. The gas mixture previously sucked out of the air pipe 14 is pumped back into the air pipe 14, such that the air is pumped backwards and forwards, for example, i.e., swirled. Here, the pressure, also called suction pressure, prevailing in the air pipe 14 increases somewhat, in particular in a region between the surrounding pressure and idling suction pipe pressure.

Figure 8:
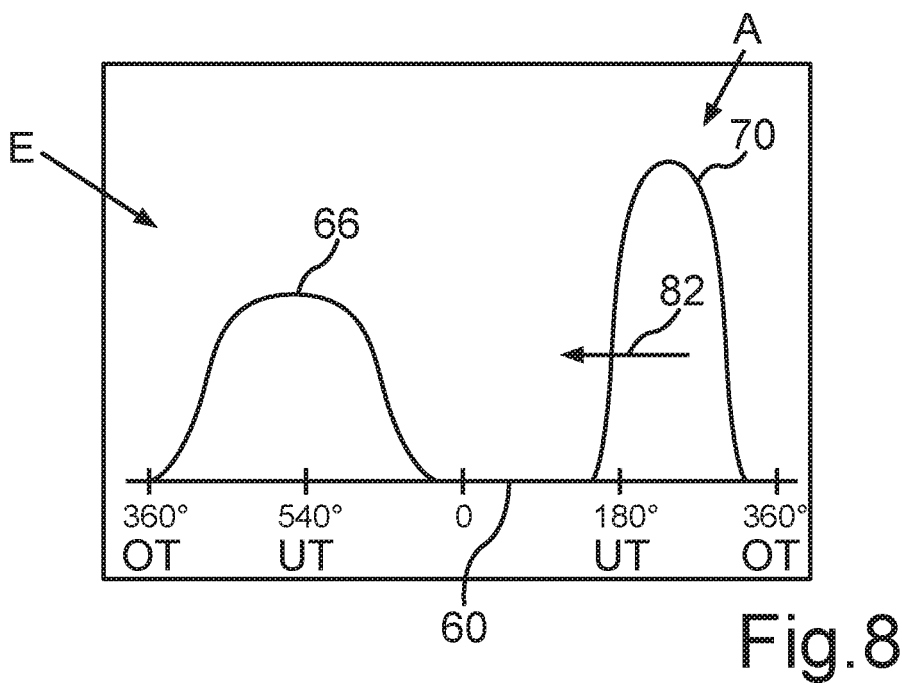
FIG. 8 is a diagram for further illustrating the method.

FIG. 8 illustrates, in particular, that, depending on the position of the exhaust cam shaft 54, there is the possibility of sucking in remaining gas or exhaust gas from the exhaust channel 52 and sucking it into the cylinder 18 and mixing it with the swirling air, which is also called swirling gas. When reintroducing the combustion and thus the fired operation, this has the advantage that the catalytic converter can be cleaned in a transition with remaining gas (exhaust gas) and thus does not have any transition with superfluous air. Here, in FIG. 8 an arrow 82 illustrates the cam shaft adjustment of the exhaust cam shaft 54 in the advance direction. Furthermore, the pressure prevailing in the air pipe 14, for example, corresponds at least substantially to the surrounding pressure. The further the exhaust cam shaft 54 is set in the advance direction, the more remaining gas can be sucked back in, i.e., sucked into the cylinder 18. If, for example, a propulsion request is not characterised by the signal, but a stop request, such that the internal combustion engine 10 is not switched into the propulsion operation, for example, as a result of the detection of the signal, then the following step or process is carried out, for example, in addition to the steps or processes described above: the throttle flap 44 is opened briefly and closed again straight away, in particular such that the pressure representing a negative pressure and prevailing in the air pipe 14 can be equalised to the surrounding pressure. This has the following effect: in contrast to the propulsion operation, the internal combustion engine 10 or its output shaft 28 does not also rotate during the stop request such that the negative pressure can also not equalise to the intake side E or in the air pipe 14. A pressure in the air pipe 14 close to the surrounding pressure improves a restart following the switching off of the internal combustion engine 10 completely. For ending the propulsion operation called the propulsion phase or a stop phase, during which the internal combustion engine 10 is deactivated completely, i.e., for a restart of the internal combustion engine 10, the steps and processes described above are performed in the opposite sequence, in order reactivate the fired operation called the combustion operation or combustion mode.

An electric engine, in particular a hybridized system, can be useful during the method by such an electric engine accelerating the switching off or starting processes, in particular in relation to a very swift reaching of a desired target rotational speed. This applies to P1 and P2 hybrid systems, A conventional combustion motor can also benefit from the valve control strategy described when achieving an oxygen-free stroke or switching off process and restart.

The following advantages can be achieved during the engine start and engine stop: the decompression cam is useful for the engine start and engine stop in order to be able to prevent oxygen intake into the catalytic converter or keep it particularly low. Here, the strategy is the same as with the stroke switching off and reuse of the fired operation. When starting, the first combustion takes place in the cylinder 18 on the decompression cam, so that it does not result in a flushing through of the fresh air in the starting process or with a towed high rotation of the engine and in order to be able to strip out exhaust gas in the cylinder 18 and ensure a moment-free, stoichiometric combustion. If this is carried out, normally it is switched back to the standard cam, also called the combustion cam, and the moment can be constructed.

Similarly, a combination or conversion of a direct start function is possible. The necessary filling of the cylinder 18 or the present air mass in the cylinder 18, also called the combustion chamber, is ascertained before switching to the decompression cam. When switching to the standard cam, this is known, yet the combustion air ratio of the first combustion can be exactly set, With hybrid drive trains, the engine is to be brought to a target rotation speed with load requirements still in the decompression cam by the electric engine or is to be operated until the first cylinder is switched to the standard or combustion cam. As soon as the switching takes place, the injection, i.e., the fuel supply, is released again.

With a further variant of the method according to the invention, the cam 42 is designed as an FES cam. The FES cam is, for example, a cam which causes a valve elevation curve, in which the stroke of the intake valve 34 is declined to 0 even before the lower dead center UT. In other words, the FES cam causes a valve elevation curve, which has a smaller angle range in comparison to the standard cam, in which the intake valve 34 is open. However, when using an FES cam, there is a collision danger between the piston 24 and the intake valve 34. The opening region of the intake valve should be a few degrees before the lower dead center UT when using an FES cam. The best variant is the as late as possible adjustment in order to not suck in any air.

Figure 9:
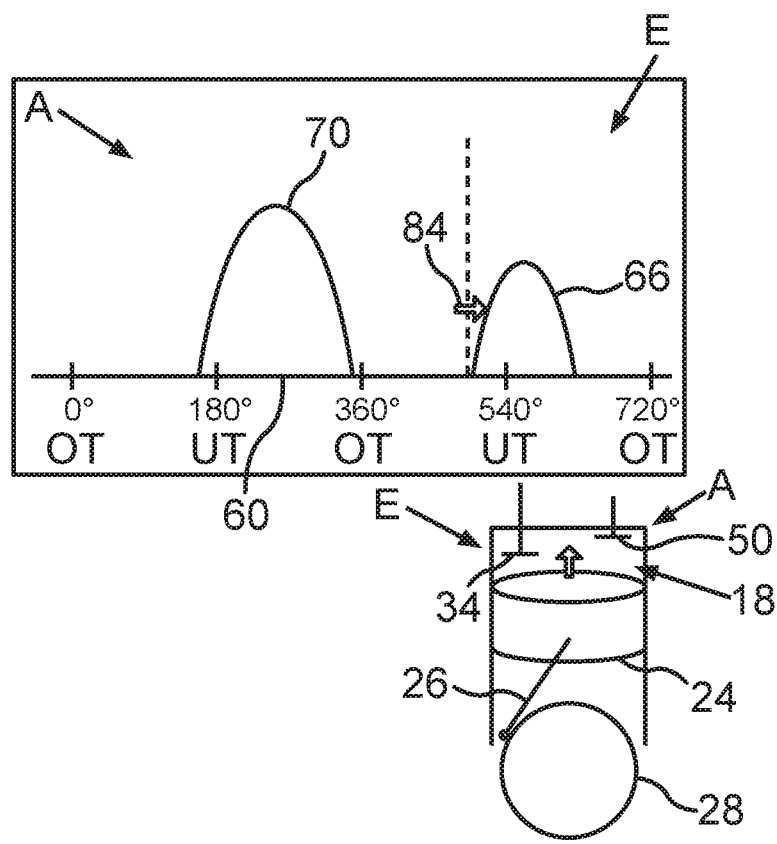
FIG. 9 is a diagram for further illustrating the method.

FIG. 9 illustrates, for example, the actuation of the intake valve 34 by means of the FES cam, which causes the valve elevation curve 66. Here, an arrow 84, for example, illustrates an adjustment of the intake cam shaft 38 and thus the FES cam later. On the exhaust side A, the standard exhaust cam is used, for example, by means of which the valve elevation curve 70, according to which the exhaust valve 50 is actuated, is caused.

In the method according to the invention, it can be provided, in principle, that the exhaust valve 50 is actuated by means of an exhaust standard cam. Alternatively, it is conceivable that a plateau cam causing the valve elevation curve 72 and thus the plateau 74 is used for actuating the exhaust valve 50 on the exhaust side A for actuating the exhaust valve 50, wherein the plateau cam generates a valve intersection, for example, in the upper dead center OT. The plateau cam, in particular its cam shape, has the particular property that the exhaust valve 50 can furthermore be opened, although the piston 24 has already reached the upper dead center OT. With this configuration, exhaust gas flowing out can be sucked back in, fresh load can be replaced by exhaust gas, and the mass flow can be reduced by the engine. Thus, the flushing through with air is prevented by the engine and kept at least low. With a further variant, an early closing of the exhaust valve 50 is conceivable, whereby exhaust gas is retained. The flushing through with fresh air is thus also prevented by the engine.

When using an electric cam shaft adjustment, improvements in terms of comfort start behavior and start time shortening emerge for the possibilities mentioned above. The respective cam shaft can be set to the optimal re-use behavior during a standing engine. A hydraulic adjustment requires a rotating motor or a rotating output shaft 28.

Pollutant emissions from internal combustion engines 10 formed, for example, as homogeneously operating and, where necessary, hybridized gasoline engines, having the three-way catalytic converter can be further reduced by the method described above and, simultaneously, the fuel consumption can be kept particularly low. This includes the reduction of nitrogen oxides, carbon monoxide, particulate numbers and carbon dioxide. The danger of sucking in oil can be reduced since the absolute pressure in the suction tract 12, in particular between the throttle flap 44 and the cylinder 18, can be increased in the propulsion operation. The omission of the lean-rich exchange of the catalytic converter during the propulsion operation and reintroduction of the fired operation leads to a clearly lower cat-ageing because no oxygen, among other things, can thus reach the heated cat-surface. Fewer throttle losses emerge in the suction tract 12 in the propulsion operation. In combination with the elimination of the short-term rich operation, it results in a fuel consumption reduction.

LIST OF REFERENCE CHARACTERS

10 Internal combustion engine
12 Suction tract
14 Air pipe
16 Engine housing
18 Cylinder
20 Air
22 Exhaust gas tract
24 Piston
26 Conrod
28 Output shaft
30 AXIS of rotation
32 Outside ignition device
34 Intake valve
36 Intake channel
38 Intake cam shaft
40 First cam
42 Second cam
44 Throttle flap
46 Pivot axis
48 Flow cross-section
50 Exhaust valve
52 Exhaust channel
54 Exhaust cam shaft
56 Exhaust gas after-treatment element
58 Electronic calculating device
60 x-axis
62 y-axis
64 Valve elevation curve
66 Valve elevation curve
68 Double arrow
70 Valve elevation curve
72 Valve elevation curve
74 Plateau
76 Valve elevation curve
78 Double arrow
80 Arrow
82 Arrow
84 Arrow
A Exhaust side
AS Exhaust closed
E Intake side
ES Intake closed
OT Upper dead center
UT Lower dead center

The invention claimed is:

1. A method for operating an internal combustion engine of a motor vehicle, wherein the internal combustion engine has a cylinder, a piston moveably received in the cylinder, an intake valve allocated to the cylinder, an air pipe via which at least air flowing through the air pipe is supplyable to the cylinder, and a valve element disposed in the air pipe for setting a flow cross-section that is flowable through by the air, comprising the steps of:

a) detecting a signal for causing a fuel supply of the cylinder to switch off;

b) as a result of the detecting, moving the valve element out of a first position triggering a first value of the flow cross-section into a second position triggering a second value of the flow cross-section that is lower in comparison to the first value, while the fuel supply of the cylinder is still activated, wherein a first cam for actuating the intake valve is allocated to the intake valve; and c) while the fuel supply of the cylinder is still activated, switching from the first cam to a second cam which is different from the first cam, wherein via the second cam the intake valve is actuated as a result of the switching such that the intake valve causes a reduced air intake in comparison to an actuation of the intake valve caused previously by the first cam;

wherein in step b), an exhaust cam shaft allocated for actuating an exhaust valve allocated to the cylinder is set in an advance direction such that the exhaust valve is already closed when the piston reaches upper dead center.

2. The method according to claim 1, wherein in step b) or in step c), an ignition angle adjustment of a spark ignited internal combustion engine is carried out in a retarded direction.

3. The method according to claim 1, wherein the first and second cams are driven for actuating the intake valve via an intake cam shaft whereby the intake valve is actuated.

4. The method according to claim 3, wherein in step c), the intake cam shaft is adjusted in a retarded direction.

5. The method according to claim 3, wherein after step c), the intake cam shaft and thus the second cam are adjusted in a retarded direction, wherein, as a result of the adjustment of the intake cam shaft and thus of the second cam in the retarded direction, air flowing out of the air pipe into the cylinder is shifted back into the air pipe out of the cylinder by the piston.

6. The method according to claim 1, wherein after step c), the fuel supply is switched off depending on the detecting, or after step c), the valve element is moved into a third position triggering a third value of the flow cross-section that is lower in comparison to the second value.

7. The method according to claim 1, wherein a decompression cam or an early intake closed cam causing earlier closing of the intake valve in comparison to the first cam is used as the second cam.

* * * * *